UNITED STATES PATENT OFFICE.

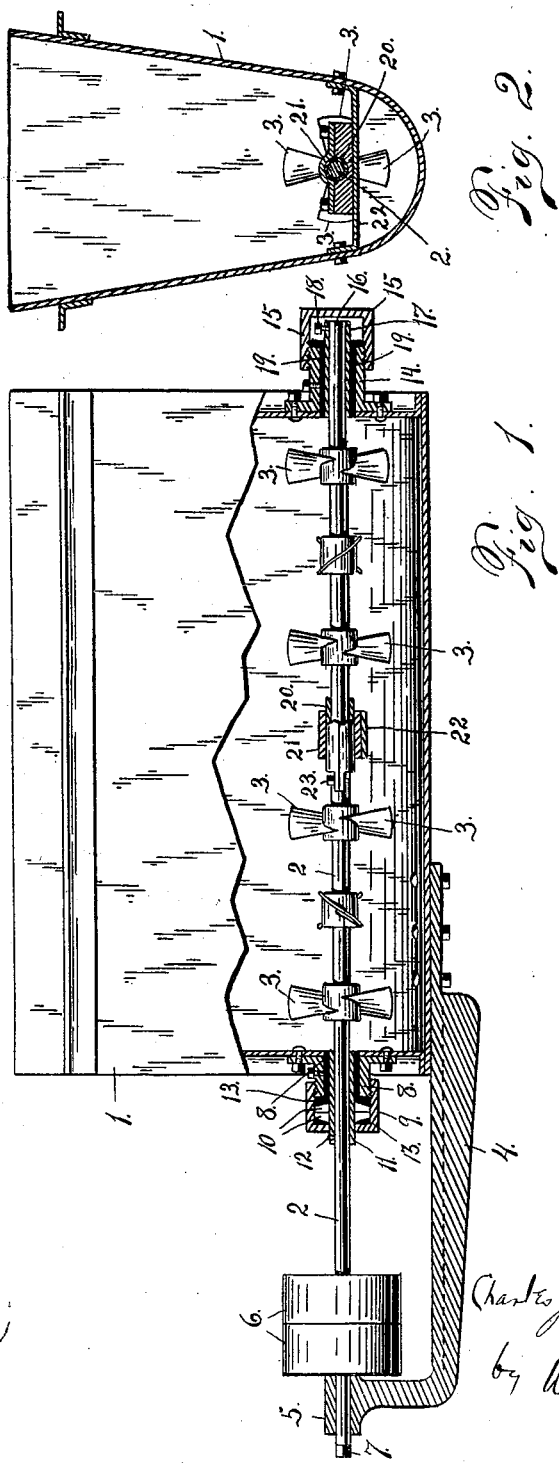

CHARLES JOHN McLENNAN, OF BUFFALO, NEW YORK.

PAINT-MIXER.

SPECIFICATION forming part of Letters Patent No. 646,555, dated April 3, 1900.

Application filed December 30, 1897. Renewed February 6, 1900. Serial No. 4,282. (No model.)

*To all whom it may concern:*

Be it known that I, CHARLES JOHN MC-LENNAN, a citizen of the United States, residing at Buffalo, in the county of Erie and State of New York, have invented certain new and useful Improvements in Agitating-Tanks for Mixed Paints; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in agitating-tanks for mixed paints designed for use with what is known as the "dipping" process, in which articles are coated with paint by immersion. In tanks of this description considerable wear occurs on the revolving shaft carrying the agitators at the points where it rests in its bearings. This extraordinary wear is caused by the packing taking up the thin matter from the paint and leaving the gritty substance on the outside of the packing next to the shaft, which in time accumulates and forms a crust which acts upon the shaft the same as emery would and in a very short time cuts the shaft, thus rendering the substitution of a new shaft imperative.

The object of my invention is to obviate this difficulty, and thereby effect a considerable saving in time, trouble, and expense.

To that end my invention consists of certain details of construction, all of which will be fully hereinafter described and claimed.

In the drawings, Figure 1 is a side elevation of a mixing-tank, broken away to show the shaft and its agitators and showing the bearings in section; and Fig. 2 is a central vertical transverse section of the mixing-tank shown in Fig. 1.

Referring to the drawings, 1 is the tank, of ordinary construction.

2 is the shaft journaled in bearings in the tank, having mounted thereon a series of beaters or agitators 3. A bearing support or bracket 4 is bolted to the bottom of the tank at one end thereof, its outer end being provided with the auxiliary bearing 5 for the reception of the projecting end of the shaft carrying the pulleys 6 6. The outer end 7 of the shaft is squared, so that a large wrench can be used to help the belt should the agitators be stuck in the sediment in the bottom of the tank. The bearing-supports 4 5 just described are for the purpose of steadying the shaft 1 in its bearings proper, which I will now describe, taking first the bearing at the left-hand end of the tank.

8 is the stuffing-box support or bearing bolted to the tank. Its outer cylindrical end is screw-threaded for the removable reception of the stuffing-box nut 9, which forms the chamber for the stuffing-rings 10.

11 is the shaft-protecting sleeve, which surrounds the shaft 1 and is tightly secured thereto by the set-screw 12 and turns with the shaft. The packing-rings 10 surround this sleeve and are flanked on either side by the brass bushings 13 13, which are used to take the wear from the parts between which they are placed.

The sleeve 11 when worn can be removed by taking out the set-screw 12, and a new one can be substituted without the necessity of removing the shaft, as has heretofore been the case where my improved protective sleeve was not employed. In this manner much time and expense are saved, and the shaft is not worn in the least.

At the right-hand end of the tank the bearing is slightly different. The bearing-support 14 is similar to the stuffing-box support 8 at the opposite end of the tank, and the nut 15 differs from the stuffing-box nut 9 by having a closed end which surrounds the projecting end 16 of the shaft. This nut 15 has screw-threaded engagement with the bearing 14, forming a tight joint therewith, thereby doing away with the necessity of packing-rings.

17 is the protective sleeve, tightly secured around the shaft by the set-screw 18, and the brass bushing 19 is interposed between the sleeve 17 and the bearing-support 14 to take the wear away from these parts. This protective sleeve 17 is also quickly removed when worn by unscrewing the nut 15 and set-screw 18 and a new one substituted.

20 is the shaft-protecting sleeve at the center bearing 21, which is secured to the cross-support 22, bolted to the inner wall of the tank at opposite sides thereof. This sleeve 20 is split and held together by bolts 23. When it is necessary to put on a new one, merely loosen the bolts. The sleeve is to be bolted to the shaft sufficiently tight to revolve with the same in the bearing.

With my improved protecting-sleeves at the end and center bearings, as described, the shaft 2 is absolutely free from the destructive wear now occasioned in the present style of bearings employed in agitating-tanks for mixed paints.

I claim—

In an agitating-tank for mixed paints the combination with the revolving shaft the stuffing-box support or bearing, the stuffing-box nut and the brass bushing of the metallic sleeve removably secured around the shaft inside the stuffing-box support and nut, to avoid wear of and prevent injury to the shaft.

In testimony whereof I have signed my name to this specification in the presence of two subscribing witnesses.

CHARLES JOHN McLENNAN.

Witnesses:
W. T. MILLER,
C. B. BUTLER.